US012234426B2

(12) United States Patent
Man et al.

(10) Patent No.: US 12,234,426 B2
(45) Date of Patent: *Feb. 25, 2025

(54) CLEANING COMPOSITIONS EMPLOYING EXTENDED CHAIN ANIONIC SURFACTANTS

(71) Applicant: ECOLAB USA INC., Saint Paul, MN (US)

(72) Inventors: Victor Fuk-Pong Man, Saint Paul, MN (US); Derrick Richard Anderson, Saint Paul, MN (US); Yvonne Marie Killeen, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,303

(22) Filed: Oct. 9, 2023

(65) Prior Publication Data

US 2024/0052263 A1 Feb. 15, 2024

Related U.S. Application Data

(63) Continuation of application No. 17/656,040, filed on Mar. 23, 2022, now Pat. No. 11,814,604, which is a (Continued)

(51) Int. Cl.

*C11D 1/12* (2006.01)
*C11D 1/29* (2006.01)
(Continued)

(52) U.S. Cl.

CPC .............. *C11D 1/83* (2013.01); *C11D 3/2068* (2013.01); *C11D 17/0021* (2013.01); (Continued)

(58) Field of Classification Search

CPC .... C11D 1/12; C11D 1/29; C11D 1/66; C11D 1/72; C11D 1/83; C11D 3/042; C11D 3/386

See application file for complete search history.

(56) References Cited

U.S. PATENT DOCUMENTS

| | | | |
|---|---|---|---|
| 6,667,044 | B1 | 12/2003 | Diec et al. |
| 7,371,716 | B2 | 5/2008 | Ruland et al. |

(Continued)

FOREIGN PATENT DOCUMENTS

| | | |
|---|---|---|
| EP | 0368146 A2 | 5/1990 |
| EP | 0573341 B1 | 12/1993 |

(Continued)

OTHER PUBLICATIONS

Barber, J.A.S. et al., "Fluorescent tracer technique for measuring the quantity of pesticide deposited to soil following spray applications" Crop Protection 22, 15-21, Dec. 31, 2003.

(Continued)

*Primary Examiner* — Brian P Mruk
(74) *Attorney, Agent, or Firm* — McKee, Voorhees & Sease, PLC

(57) ABSTRACT

The invention discloses synergistic combinations of surfactant blends and cleaning compositions employing the same. In certain embodiments a surfactant system is disclosed which includes an extended anionic surfactant with novel linker surfactants including one or more of an alkyl glycerol ether, an ethoxylated alkyl glycerol ether, an alcohol ethoxylate and/or a Gemini surfactant. This system forms emulsions with, and can remove greasy and oily stains, even those comprised of non-trans fats. The compositions may be used alone, as a pre-spotter or other pre-treatment or as a part of a soft surface or hard surface cleaning composition.

20 Claims, 5 Drawing Sheets

Microemulsion plot: anionic extended surfactant (X-AES) with co-surfactant ethylhexyl glycerine ether. **Note: Initial experimentation assumed X-AES was 25% active, but late determined it was 63.4% active.

Related U.S. Application Data continuation of application No. 16/949,957, filed on Nov. 20, 2020, now Pat. No. 11,312,923, which is a continuation of application No. 16/353,066, filed on Mar. 14, 2019, now Pat. No. 10,883,068, which is a continuation of application No. 15/411,280, filed on Jan. 20, 2017, now Pat. No. 10,273,433.

(51) Int. Cl.

| | |
|---|---|
| ***C11D 1/66*** | (2006.01) |
| ***C11D 1/72*** | (2006.01) |
| ***C11D 1/83*** | (2006.01) |
| ***C11D 3/20*** | (2006.01) |
| ***C11D 3/386*** | (2006.01) |
| ***C11D 17/00*** | (2006.01) |
| *C10N 50/00* | (2006.01) |

(52) U.S. Cl.

CPC . *C10M 2203/024* (2013.01); *C10M 2207/401* (2013.01); *C10N 2050/01* (2020.05); *C11D 1/29* (2013.01); *C11D 1/72* (2013.01)

(56) References Cited

U.S. PATENT DOCUMENTS

| | | | | |
|---|---|---|---|---|
| 7,419,552 | B2 | 9/2008 | Ruland et al. | |
| 8,580,727 | B2 * | 11/2013 | Man | C11D 1/83 510/357 |
| 8,785,363 | B2 * | 7/2014 | Man | C11D 1/83 510/357 |
| 10,273,433 | B2 * | 4/2019 | Man | C11D 17/0021 |
| 10,662,396 | B2 * | 5/2020 | Man | A61K 8/604 |
| 10,883,068 | B2 * | 1/2021 | Man | C11D 1/83 |
| 11,136,533 | B2 * | 10/2021 | Man | A61K 8/463 |
| 11,312,923 | B2 * | 4/2022 | Man | C11D 3/2068 |
| 11,549,083 | B2 * | 1/2023 | Man | A01N 25/30 |
| 11,814,604 | B2 * | 11/2023 | Man | C11D 17/0021 |
| 2006/0211593 | A1 * | 9/2006 | Smith | C11D 1/831 510/424 |
| 2014/0041131 | A1 * | 2/2014 | Man | C11D 1/83 510/276 |

FOREIGN PATENT DOCUMENTS

| | | | |
|---|---|---|---|
| JP | 63073140 | A | 4/1988 |
| JP | 1100442 | A | 4/1989 |
| JP | 10292199 | A | 11/1998 |
| JP | 2001246339 | A | 9/2001 |
| JP | 2009210514 | A | 9/2009 |
| WO | 199732962 | A1 | 9/1997 |
| WO | 199927054 | A1 | 6/1999 |
| WO | 200068348 | A1 | 11/2000 |
| WO | 2007064525 | A1 | 6/2007 |
| WO | 2007101470 | A1 | 9/2007 |
| WO | 2010086821 | A2 | 8/2010 |

OTHER PUBLICATIONS

Bergervoet, P.W.M. et al., “Application of the forensic Luminol for blood in infection control”, Journal of Hospital Infection, 68, 329-333 Dec. 31, 2008.

Carling, Philip C. et al., “Improved Cleaning of Patient Rooms Using a New Targeting Method” Clinical Infectious Diseases, pp. 285-288 Dec. 31, 2006.

Charoensaeng, Ampira et al., “Solubilization and Adsolubilitzation of Polar and Nonpolar Organic Solutes by Linker Molecules and Extended Surfactants”, J. Surfact. Deterg., 12:209-217. Jan. 1, 2009.

Do, Linh D. et al., “Environmentally Friendly Vegetable Oil Microemulsions Using Extended Surfactants and Linkers”, J Surfact. Deterg., 12:91-99. Jan. 1, 2009.

Griffith, C. J. et al., “An evaluation of hospital cleaning regimes and standards”, Journal of Hospital Infection, 45:19-28, Dec. 31, 2000.

Hartel, Peter G. et al., “Exposing water samples to ultraviolet light improves fluorometry for detecting human fecal contamination”, Water Research 41, pp. 3629-3642, Dec. 31, 2007.

Lipscomb, I.P. et al., “Rapid method for the sensitive detection of protein contamination on surgical instruments”, Journal of Hospital Infection, 62, pp. 141-148 Dec. 31, 2006.

Lu, Y.F. et al., “Laser surface cleaning and real-time monitoring”, Proceedings of SPIE vol. 4070, pp. 331-337, Dec. 31, 2000.

Mori, F et al., “Equilibrium and dynamic behavior of a system containing a mixture of anionic and nonionic surfactants” Progress in Colloid & Polymer Science, 82:114-121, 1990.

Phan, Tri T. et al., “Microemulsion-Based Vegetable Oil Detergency Using an Extended Surfactant”, J. Surfact. Deterg., 13:313-319, Mar. 2010.

Pyrek, Kelly, Virgo Publishing, “Hospitals Can Learn from CSI Sleuthing Methods”, www.infectioncontroltoday.com, 1 page, posted Jun. 9, 2008.

Salo, Satu et al., “Cleaning validation of fermentation tanks”, Food and Bioproducts Processing 86, pp. 204-210, Dec. 31, 2008.

Wisniewski, Karen, “Specialty Liquid Household Surface Cleaners” Colgate-Palmolive Company, pp. 463-512 Dec. 30, 2011.

Witthayapanyanon, Anuradee et al., “Interfacial Properties of Extended-Surfactant-Based Microemulsions and Related Macroemulsions” J. Surfact. Deterg., 13:127-134, 2010.

Zhang, Hui et al., “Lauryl Alcohol and Amine Oxide as Foam Stabilizers in the Presence of Hardness and Oily Soil” Journal of Surfactants and Detergents, vol. 8, No. 1, pp. 99-107, 2005.

“Cleanser Alcohol hand Rub Training Gel Fluorescent Gel 500 ml bottle with Integral Pump Dispenser”, website, www.my.supplychain.nhs.uk/catalogue/product/mrb180/cleanser-alcohol-hand-run-training-gel-500ml-bottle-with-integral-pump-dispenser, 1 page. Mar. 25, 2011.

Ecolab USA Inc., PCT/US2010/049319, filed Sep. 17, 2010, “International Search Report”, 3 pages, mailed Jun. 1, 2011.

Ecolab USA Inc., PCT/US2010/049326, filed Sep. 17, 2010, “International Search Report”, 4 pages, mailed Jun. 1, 2011.

Ecolab USA Inc., PCT/US2010/049334, filed Sep. 17, 2010, “International Search Report”, 3 pages, mailed Jun. 21, 2011.

Ecolab USA Inc., PCT/US2010/049338, filed Sep. 17, 2010, “International Search Report”, 3 pages, mailed Jun. 28, 2011.

* cited by examiner

Microemulsion plot: anionic extended surfactant (X-AES) with co-surfactant ethylhexyl glycerine ether. **Note: Initial experimentation assumed X-AES was 25% active, but late determined it was 63.4% active.

CLEANING COMPOSITIONS EMPLOYING EXTENDED CHAIN ANIONIC SURFACTANTS

CROSS-REFERENCE TO RELATED APPLICATION

This is a Continuation Application of U.S. Ser. No. 17/656,040, filed Mar. 23, 2022, now U.S. Pat. No. 11,814,604, issued Nov. 14, 2023, which is a Continuation Application of U.S. Ser. No. 16/949,957, filed Nov. 20, 2020, now U.S. Pat. No. 11,312,923, issued Apr. 26, 2022, which is a Continuation Application of U.S. Ser. No. 16/353,066, filed Mar. 14, 2019, now U.S. Pat. No. 10,883,068, issued Jan. 5, 2021, which is a Continuation Application of U.S. Ser. No. 15/411,280, filed Jan. 20, 2017, now U.S. Pat. No. 10,273,433, issued Apr. 30, 2019, all of which are herein incorporated by reference in their entirety.

FIELD OF THE INVENTION

The invention relates to surfactant systems and cleaning compositions which employ synergistic combinations of components including extended chain anionic surfactants. The cleaning compositions are useful for removing a number of challenging stains including non-trans fats and fatty acids by forming emulsions with such oily and greasy soils for their removal.

BACKGROUND OF THE INVENTION

Surfactants reduce the surface tension of water by adsorbing at the liquid-gas interface. They also reduce the interfacial tension between oil and water by adsorbing at the liquid-liquid interface. Surfactants are a primary component of most detergents. When dissolved in water, surfactants give a product the ability to remove soil from surfaces. Each surfactant molecule has a hydrophilic head that is attracted to water molecules and a hydrophobic tail that repels water and simultaneously attaches itself to oil and grease in soil. These opposing forces loosen the soil and suspend it in the water.

Surfactants do the basic work of detergents and cleaning compositions by breaking up stains and keeping the soil in the water solution to prevent re-deposition of the soil onto the surface from which it has just been removed. Surfactants disperse soil that normally does not dissolve in water.

Nonylphenol ethoxylates (NPEs) are predominantly used as industrial and domestic detergents as a surfactant. However, while effective, NPEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods.

An alternative to NPEs are alcohol ethoxylates (AEs). These alternatives are less toxic and degrade more quickly in the environment. However, it has recently been found that textiles washed with NPE free and phosphorous free detergents containing AEs smoke when exposed to high heat, e.g., in a steam tunnel in industrial laundry processes, or when ironed.

Surfactants are often incorporated in a cleaning composition to clean soiled surfaces. One of the preferred mechanisms is by microemulsifying these soils. Surfactants are also often incorporated into an oil-in-water microemulsion to make oil containing products appear more homogenous. These oil containing products include a variety of different surfactant systems in 5-20% solubilized oil which may be used as is or which are then diluted with water prior to use. Examples of these oil containing products include cosmetics, products containing oily solvents for degreasing, such as terpene, and other water immiscible solvents. The surfactant systems generally employed in these cleaning products include a mixture of anionic or non-ionic surfactants and a short chain alcohol to help solubilize the oil phase and prevent liquid crystal formation. While short chain alcohols are effective, they also contribute to the volatile organic solvent content (VOC) of the product and pose flammability problems.

As can be seen there is a continuing need to develop effective, environmentally friendly, and safe surfactants and surfactant systems that can be used in cleaners of all kinds. This is particularly so in light of several new cleaning challenges that have emerged.

Health authorities have recently recommended that trans fats be reduced or eliminated in diets because they present health risks. In response, the food industry has largely replaced the use of trans fats with non-trans fats. These types of non-trans fats are the most difficult to remove from surfaces because; 1) the high molecular weight of triglyceride oil results in more difficulty in forming either dispersions or bicontinuous structures, 2) the polyunsaturation of triglyceride oil makes it difficult to be handled by conventional surfactants, and 3) polymerization of the triglyceride oil makes it even more difficult to remove. The food industry and textile cleaning industry have also experienced an unexplained higher frequency of laundry fires. Textile items such as rags that are not effectively washed to better remove non-transfats are prone to cause fire due their substantial heat of polymerization of the trans fats. Non-transfats have conjugated double bonds that can polymerize and the substantial heat of polymerization involved can cause fire, for example, in a pile of rags used to mop up these non-transfat soils.

As can be seen, there is a need in the industry for improvement of cleaning compositions, such as hard surface and laundry detergents and particularly the surfactants used therein so that difficult soils can be removed in a safe environmentally friendly and effective manner.

SUMMARY OF THE INVENTION

The invention meets the needs above by providing a surfactant system, mixture or blend that can be used alone or as a part of a detergent, hard surface cleaner or a pre-spotting treatment. The surfactant system is capable of forming emulsions with, and thus removing, oily and greasy stains. In a preferred embodiment the surfactant compositions of the invention can remove non-transfat and fatty acid stains. Generally, non-transfats are more difficult to remove than transfats both from a cleaning and removal standpoint as well as laundry safety concern due to heat of polymerization of the non-trans fats. The invention is highly effective for removal of transfats, and other oily soils.

The invention has many uses and applications which include but are not limited to: laundry cleaning, reduction of laundry fire due to non-transfats, and hard surface cleaning such as manual pot-n-pan cleaning, machine warewashing, all purpose cleaning, floor cleaning, CIP cleaning, open facility cleaning, foam cleaning, vehicle cleaning, etc. The invention is also relevant to non-cleaning related uses and applications such as dry lubes, tire dressings, polishes, etc.

as well as triglyceride based lotions, suntan lotions, potentially pharmaceutical emulsions and microemulsions.

The surfactant system comprises a synergistic combination of components with an extended chain anionic surfactant. The extended anionic surfactant is preferably one with at least 5 moles of propoxylation. Most preferred is from about 5 to about 8 moles of propoxylation.

Further in a preferred embodiment the extended chain anionic surfactant is combined with a linker or co-surfactant. The linker can be a single hydrophobic tail with hydrophilic head of small effectively hydrated radius which previously included amine oxides, fatty acids, mono glycerides, long chain alcohols or the linker can have twin hydrophobic tails with hydrophilic head of "regular or large" effectively hydrated radius di-octyl sulfosuccinate, diglyceride). According to the invention, applicants have identified several novel linker co-surfactants which in, combination with specific anionic extended chain surfactants provide microemulsions that are non-gelling with low viscosity and are stable indefinitely and over a wide temperature range. The novel co-surfactants include alkyl glycerol ethers with 0 to 3 moles of ethoxylation, short chain alcohols with low moles of ethoxylation, and Gemini surfactants. The extended anionic surfactant is the primary surfactant and the co-surfactant is present in a lesser amount.

In certain embodiments the surfactants system is part of a cleaning composition which further includes a multiply charged cation such as $Mg^{2+}$, $Ca^{2+}$ or other functional electrolyte such as an alkalinity source or a chelating agent. The resultant combination is highly effective at forming microemulsions with non-transfats at relatively low temperatures. This system can be used in formulations for laundry detergents, hard surface cleaners, whether alkali or acid based, or even by itself as a pre-spotting agent.

In a further aspect of the present invention, a laundry detergent composition is provided which includes the surfactant system of the invention, a builder and an enzyme; the laundry detergent product being adapted to readily dissolve and disperse non trans fats in commercial, industrial and personal laundry washing processes or in a pre-spotting treatment.

These and other objects, features and attendant advantages of the present invention will become apparent to those skilled in the art from a reading of the following detailed description of the preferred embodiment and the appended claims.

DETAILED DESCRIPTION OF THE INVENTION

Figure 1:
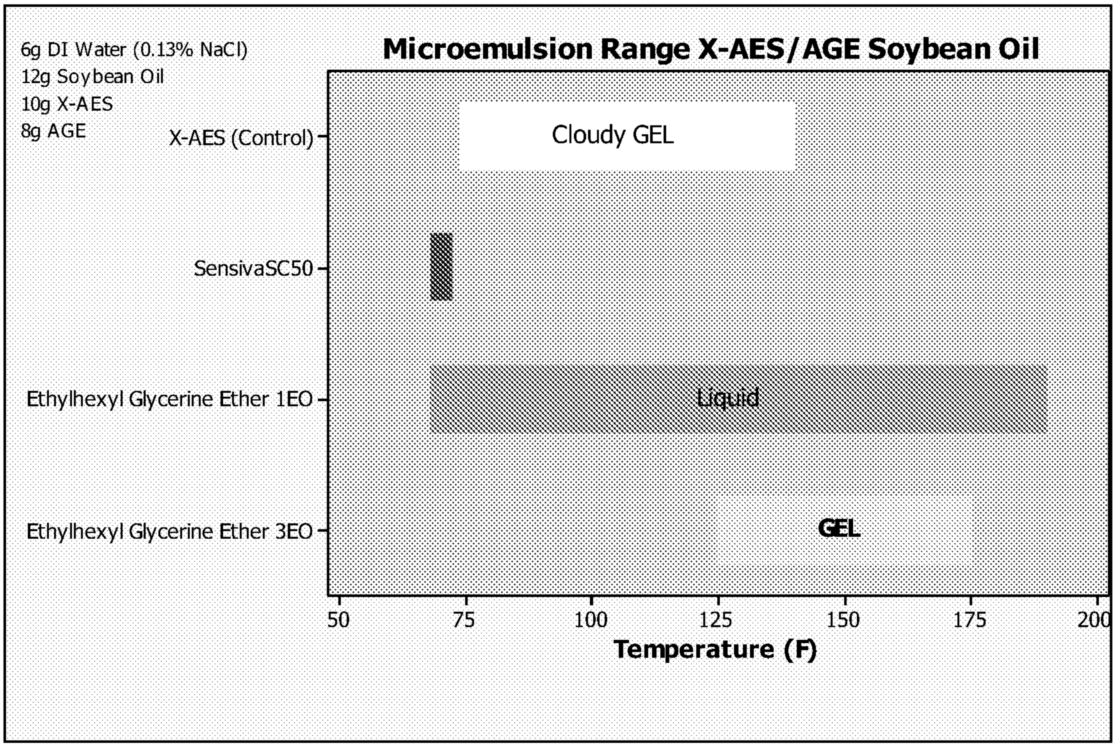
FIG. 1 is a microemulsion plot of anionic extended surfactant (X-AES) with co-surfactant ethylhexyl glycerine ether over various temperatures. One can see the advantage of ethoxylation.

So that the invention may be more readily understood, certain terms are first defined and certain test methods are described.

As used herein, "weight percent," "wt-%", "percent by weight", "% by weight", and variations thereof refer to the concentration of a substance as the weight of that substance divided by the total weight of the composition and multiplied by 100. It is understood that, as used here, "percent", "%", and the like are intended to be synonymous with "weight percent", "wt-%", etc.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "surfactant" as used herein is a compound that contains a lipophilic segment and a hydrophilic segment, which when added to water or solvents, reduces the surface tension of the system.

An "extended chain surfactant" is a surfactant having an intermediate polarity linking chain, such as a block of poly-propylene oxide, or a block of poly-ethylene oxide, or a block of poly-butylene or a mixture thereof, inserted between the surfactant's conventional lipophilic segment and hydrophilic segment.

The term "electrolyte" refers to a substance that will provide ionic conductivity when dissolved in water or when in contact with it; such compounds may either be solid or liquid.

As used herein, the term "microemulsion" refers to thermodynamically stable, isotropic dispersions consisting of nanometer size domains of water and/or oil stabilized by an interfacial film of surface active agent characterized by ultra low interfacial tension.

It should be noted that, as used in this specification and the appended claims, the singular forms "a", "an", and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

The term "hard surface" refers to a solid, substantially non-flexible surface such as a counter top, tile, floor, wall, panel, window, plumbing fixture, kitchen and bathroom furniture, appliance, engine, circuit board, and dish.

The term "soft surface" refers to a softer, highly flexible material such as fabric, carpet, hair, and skin.

As used herein, the term "cleaning" refers to a method used to facilitate or aid in soil removal, bleaching, microbial population reduction, and any combination thereof.

"Soil" or "stain" refers to a non-polar oily substance which may or may not contain particulate matter such as mineral clays, sand, natural mineral matter, carbon black, graphite, kaolin, environmental dust, etc.

As used herein, the term "cleaning composition" includes, unless otherwise indicated, detergent compositions, laundry cleaning compositions, hard surface cleaning compositions, and personal care cleaning compositions for use in the health and beauty area. Cleaning compositions include granular, powder, liquid, gel, paste, bar form and/or flake type cleaning agents, laundry detergent cleaning agents, laundry soak or spray treatments, fabric treatment compositions, dish washing detergents and soaps, shampoos, body washes and soaps, and other similar cleaning compositions. As used herein, the term "fabric treatment composition" includes, unless otherwise indicated, fabric softening compositions, fabric enhancing compositions, fabric freshening compositions and combinations thereof. Such compositions may be, but need not be rinse added compositions.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated.

Exemplary treated fibers include those treated for flame retardancy. It should be understood that the term "linen" is often used to describe certain types of laundry items including bed sheets, pillow cases, towels, table linen, table cloth, bar mops and uniforms. The invention additionally provides a composition and method for treating non-laundry articles and surfaces including hard surfaces such as dishes, glasses, and other ware.

Surfactant Systems Employing Extended Chain Anionic Surfactants

The surfactant system or mixture of the invention employs one or more extended chain surfactants. These are surfactants that have, for example, an intermediate polarity poly-propylene oxide chain (or linker) inserted between the lipophilic tail group and hydrophilic polar head, which may be anionic or nonionic.

Examples of lipophilic tails groups include hydrocarbons, alkyl ether, fluorocarbons or siloxanes. Examples of anionic and nonionic hydrophilic polar heads of the extended surfactant include, but are not necessarily limited to, groups such as polyoxyethylene sulfate, ethoxysulfate, carboxylate, ethoxy-carboxylate, C6 sugar, xylitol, di-xylitol, ethoxy-xylitol, carboxylate and xytol, carboxylate and glucose.

Extended surfactants include a linker polypropylene glycol link.

The general formula for a nonionic extended surfactant is $R-[L]_x-[O-CH_2-CH_2]_y$ Where R is the lipophilic moiety, a linear or branched, saturated or unsaturated, substituted or unsubstituted, aliphatic or aromatic hydrocarbon radical having from about 8 to 20 carbon atoms, L is a linking group, or hydrophobe such as a block of poly-propylene oxide, a block of poly-ethylene oxide, a block of poly-butylene oxide or a mixture thereof; x is the chain length of the linking group ranging from 5-25; and y is the average degree of ethoxylation ranging from 1-20.

Anionic extended surfactants generally have the formula $$R-[L]_x-[O-CH_2-CH_2]_y-M$$

Where R is the lipophilic moiety, a linear or branched, saturated or unsaturated, substituted or unsubstituted, aliphatic or aromatic hydrocarbon radical having from about 8 to 20 carbon atoms, L is a linking group, or hydrophobe such as a block of poly-propylene oxide, a block of poly-ethylene oxide, a block of poly-butylene oxide or a mixture thereof; x is the chain length of the linking group ranging from 5-25; and y is the average degree of ethoxylation ranging from 1-20. Where M is any ionic species such as carboxylates, sulfonates, sulfates, and phosphates. A cationic species will generally also be present for charge neutrality such as hydrogen, an alkali metal, alkaline earth metal, ammonium and ammonium ions which may be substituted with one or more organic groups.

These extended chain surfactants attain low interfacial tension and/or high solubilization in a single phase microemulsion with oils, such as nontrans fats with additional beneficial properties including, but not necessarily limited to, insensitivity to temperature and irreversibility. For example, in one embodiment the emulsions may function over a relatively wide temperature range of from about 20 to about 280° C., alternatively from about 20 to about 180° C. (350° F.).

Many extended chain anionic and nonionic surfactants are commercially available from a number of sources. Table 1 is a representative, nonlimiting listing of several examples of the same.

TABLE 1

| Extended Surfactants | Source | % Active | Structure |
|---|---|---|---|
| Plurafac SL-42(nonionic) | BASF | 100 | $C_{6-10}$-$(PO)_3(EO)_6$ |
| Plurafac SL-62(nonionic) | BASF | 100 | $C_{6-10}$-$(PO)_3(EO)_8$ |
| Lutensol XL-40(nonionic) | BASF | 100 | (3 propyl heptanol Guerbet |
| Lutensol XL-50(nonionic) | BASF | 100 | alcohol series) |
| Lutensol XL-60(nonionic) | BASF | 100 | $C_{10}$-$(PO)_a(EO)_b$ series, where a is |
| Lutensol XL-70(nonionic) | BASF | 100 | 1.0 to 1.5, and b is 4 to 14. |
| Lutensol XL-79(nonionic) | BASF | 85 | |
| Lutensol XL-80(nonionic) | BASF | 100 | |
| Lutensol XL-89(nonionic) | BASF | 80 | |
| Lutensol XL-90 (nonionic) | BASF | 100 | |
| Lutensol XL-99 (nonionic) | BASF | 80 | |
| Lutensol XL-100 (nonionic) | BASF | 100 | |
| Lutensol XL-140 (nonionic) | BASF | 100 | |
| New Lutensol XL surfactant designed by Ecolab | BASF | 100 | C10 Guerbet alcohol $(PO)_8(EO)_3$ |
| New Lutensol XL surfactant designed by Ecolab | BASF | 100 | C10 Guerbet alcohol $(PO)_8(EO)_6$ |
| New Lutensol XL surfactant designed by Ecolab | BASF | 100 | C10 Guerbet alcohol $(PO)_8(EO)_8$ |

TABLE 1-continued

| Extended Surfactants | Source | % Active | Structure |
|---|---|---|---|
| New Lutensol XL surfactant designed by Ecolab | BASF | 100 | C10 Guerbet alcohol $(PO)_8(EO)_{10}$ |
| Ecosurf EH-3 (nonionic) | Dow | 100 | 2-Ethyl Hexyl $(PO)_m(EO)_n$ series |
| Ecosurf EH-6 (nonionic) | Dow | 100 | |
| Ecosurf EH-9(nonionic) | Dow | 100 | |
| Ecosurf SA-4(nonionic) | Dow | 100 | $C_{6-12}$ $(PO)_{3-4}$ $(EO)_4$ |
| Ecosurf SA-7 (nonionic) | Dow | 100 | $C_{6-12}$ $(PO)_{3-4}$ $(EO)_7$ |
| Ecosurf SA-9 (nonionic) | Dow | 100 | $C_{6-12}$ $(PO)_{3-4}$ $(EO)_9$ |
| Surfonic PEA-25(nonionic) | Huntsman | 100 | $C_{12-14}(PO)_2N[(EO)_{2.5}\}_2$ |
| X-AES (anionic) | Huntsman | 23 | $C_{12-14}$-$(PO)_{16}$-$(EO)_2$-sulfate |
| X-LAE6 (nonionic) | Huntsman | 100 | $C_{12-14}$-$(PO)_{16}(EO)_6$ |
| X-LAE12 (nonionic) | Huntsman | 100 | $C_{12-14}$-$(PO)_{16}(EO)_{12}$ |
| X-LAE17 (nonionic) | Huntsman | 100 | $C_{12-14}$-$(PO)_{16}(EO)_{17}$ |
| Alfoterra 123-4S (anionic) | Sasol | 30 | $C_{12-13}$-$(PO)_4$-sulfate |
| Alfoterra 123-8S (anionic) | Sasol | 30 | $C_{12-13}$-$(PO)_8$-sulfate |
| Marlowet 4561 (nonionic under acidic condition, anionic under alkaline condition) | Sasol | 90 | $C_{16-18}(PO)_4(EO)_5$-carboxylic acid |
| Marlowet 4560 (nonionic under acidic condition, anionic under alkaline condition) | Sasol | 90 | $C_{16-18}(PO)_4(EO)_2$-carboxylic acid |
| Marlowet 4539 (nonionic under acidic condition, anionic under alkaline condition) | Sasol | 90 | Iso $C_9$-$(PO)_2EO_2$-carboxylic acid |
| LP-6818-41-IP2 | Nalco | 100 | $C_{12-14}$-$(PO)_4$ |
| LP-6818-41-IP3 | Nalco | 100 | $C_{12-14}$-$(PO)_6$ |
| LP-6818-41-IP4 | Nalco | 100 | $C_{12-14}$-$(PO)_8$ |
| LP-6818-47-IP5 | Nalco | 100 | $C_{12-14}$-$(PO)_4(EO)_{12}$ |
| LP-6818-47-IP6 | Nalco | 100 | $C_{12-14}$-$(PO)_4(EO)_{14}$ |
| LP-6818-47-IP7 | Nalco | 100 | $C_{12-14}$-$(PO)_4(EO)_{16}$ |
| LP-6818-49-FB | Nalco | 100 | $C_{12-14}$-$(PO)_4(EO)_{18}$ |
| LP-6818-51-IP1 | Nalco | 100 | $C_{12-14}$-$(PO)_6(EO)_{14}$ |
| LP-6818-51-IP2 | Nalco | 100 | $C_{12-14}$-$(PO)_6(EO)_{16}$ |
| LP-6818-53-IP3 | Nalco | 100 | $C_{12-14}$-$(PO)_6(EO)_{18}$ |
| LP-6818-53-FB | Nalco | 100 | $C_{12-14}$-$(PO)_6(EO)_{20}$ |
| LP-6818-66-IP2 | Nalco | 100 | TDA-$(PO)_4$ |
| LP-6818-67-IP3 | Nalco | 100 | TDA-$(PO)_4(EO)_8$ |
| LP-6818-67-IP4 | Nalco | 100 | TDA-$(PO)_4(EO)_{10}$ |
| LP-6818-67-IP5 | Nalco | 100 | TDA-$(PO)_4(EO)_{12}$ |
| LP-6818-68-IP5 | | | |
| LP-6818-68-IP6 | Nalco | 100 | TDA-$(PO)_4(EO)_{14}$ |
| LP-6818-68-FB | Nalco | 100 | TDA-$(PO)_4(EO)_{18}$ |
| | Nalco | 100 | $C_{12-14}$-$(PO)_{20}(EO)_2$ |
| | Nalco | 100 | $C_{12-14}$-$(PO)_{20}(EO)_4$ |
| | Nalco | 100 | $C_{12}$-$(PO)_{20}(EO)_6$ |
| Isofol 12 PO5EO5 | Nalco | 100 | Guerbet $C_{12}$-$(PO)_5(EO)_5$ |
| Isofol 12 PO5EO8 | Nalco | 100 | Guerbet $C_{12}$-$(PO)_5(EO)_8$ |
| Isofol 12 PO8EO5 | Nalco | 100 | Guerbet $C_{12}$-$(PO)_8(EO)_5$ |
| Isofol 12 PO8EO8 | Nalco | 100 | Guerbet $C_{12}$-$(PO)_8(EO)_8$ |
| Capped | | | |
| Triton DF-12 | DOW | 100 | $C_{8-10}$-$(PO)_2(EO)_{11}$-Benzyl |
| Plurafac SLF-180 | BASF | 100 | C10 Guerbet alcohol $(PO)_3(EO)_{10}(PO)_{10}$ |

In a preferred embodiment the extended chain surfactant is an anionic extended chain surfactant with at least 5 moles of propoxylation. Most preferred is from about 5 to about 8 moles of propoxylation.

Linker/Co-Surfactant

According to the invention, an anionic extended chain surfactant is employed in synergistic combination with a linker such as amine oxide or dioctyl sulfosuccinate or a linker cosurfactant such as alkyl glycerol ether, monoglycerides, diglycerides, fatty acids or fatty diacids, short chain alcohols with low moles of ethoxylation and/or Gemini surfactants.

The linker is an additive which "sticks to" or "associates with" the extended chain anionic surfactant and links it with the molecules in the bulk phase, and hence increase the "reach" of the surfactant molecules which are adsorbed at interface, thus enhancing their performance. The choice among the different linkers includes considerations involving foam, pH, the type of surface to be cleaned, the cleaning temperature and the like. For example, under acid or alkaline conditions, the dioctyl suflosuccinate can rapidly degrade while amine oxide does not. The linker can be a single hydrophobic tail with hydrophilic head of small effectively hydrated radius such as amine oxides, fatty acids, mono glyceride, potentially long chain alcohol or a twin hydrophobic tails with hydrophilic head of "regular or large" effectively hydrated radius di-octyl sulfosuccinate, diglyceride).

Glycerol Ethers

The glycerol ethers used in the context of the present invention are mono- or dialkylated derivatives of glycerol. These compounds are generally known in the state of the art.

Thus, according to a first aspect, the subject matter of the invention is the use of a glycerol ether of formula:

(I)

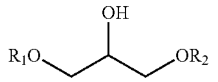

in which:

$R_1$ represents an alkyl group having from 1 to 18 carbon atoms; $R_2$ represents a hydrogen atom or an alkyl group having from 1 to 18 carbon atoms, preferably a methyl or ethyl group; as a cosurfactant.

A first preferred family of glycerol ethers capable of being used in the context of the present invention is composed of the compounds of abovementioned formula (I) in which: $R_1$ represents an alkyl group of general formula $C_xH_{2x+1}$ where x=1 to 9;

$R_2$ represents an alkyl group of general formula $C_yH_{2y+1}$ where y=0 to 8; and observing the condition $4 \leq x+y \leq 10$.

One family of glycerol ethers capable of being used in the context of the present invention is composed of the mono-alkylated glycerol compounds of abovementioned formula (I), in which: $R_3$ represents an alkyl group having from 4 to 9 carbon atoms; and $R_2$ represents a hydrogen atom.

A preferred family of glycerol ethers capable of being used in the context of the present invention is composed of the dialkylated glycerol compounds of abovementioned formula (I), in which: $R_1$ represents a methyl or ethyl group; and $R_2$ represents a methyl or ethyl group.

A particularly preferred family of glycol ethers includes of one or more glycerol monoalkyl ether(s) of the general formula $$R—O—CH_2CHOH—CH_2OH$$

in which R is a branched or unbranched $C_3$-$C_{18}$-alkyl group, where the alkyl group can be substituted by one or more hydroxyl and/or $C_1$-$C_4$-alkoxy group(s) andlor the alkyl chain can be interrupted by up to four oxygen atoms.

Particularly preferred is the 3-alkoxy-1,2-propanediols. The glycerol monoalkyl ethers according to the invention can be present as racemate (D,L) or in the form of enantiomer-enriched mixtures of the D- or L-form, or in the form of the pure enantiomers.

In one particularly preferred embodiment, the alkyl chain is interrupted by up to 4 oxygen atoms, is therefore introduced by an alcohol group which is accessible from an alcohol or diol by reaction with ethylene oxide and/or propylene oxide. In another embodiment, the alkyl group is a hydrocarbon group.

Here, the alkyl chain in the alkyl group R of the glycerol monoalkyl ether can contain alkyleneoxy groups, such as, for example, ethyleneoxy and/or propyleneoxy groups.

The alkyl group preferably contains 6 to 12 carbon atoms, particularly preferably 6 to 10 carbon atoms, in particular 8 carbon atoms, e.g. a preferred alkyl group is a hydrocarbon group having 8 carbon atoms, in particular a 2-ethylhexyl group. Thus, the particularly preferred glycerol monoalkyl ether is 3-[(2-ethylhexyl)oxy]-1,2-propanediol, which is marketed under the trade name Sensiva® SC 50 by Schulke & Mayr.

Yet another group in includes ethylene oxide/propylene oxide copolymers (Pluronics® BASF), gemini-type surfactants (Rhodia) and diphenyl ether gemini-type surfactants (DOWFAX®., Dow Chemical) discussed hereinafter.

According to the invention, the ethylene oxy or propylene oxy groups are from 0 to 3 moles of ethoxylation. The alkyl is preferably branched to increase the effective cross-sectional area of the hydrophobe.

Alcohol Ethoxylate

Additional co-surfactants include short chain ethoxylated alcohols of the formula $$R_1—(—O—CH_2)_m—OH$$

where $R_1$ is a $C_2$-$C_{12}$ hydrocarbyl chain, and the average degree of ethoxylation m is generally from 1 to 10, preferably from 1 to 6. The alkyl chain length is preferably in the $C_3$ to $C_6$ range.

The alcohol may be derived from natural or synthetic feedstock.

Gemini Surfactant

In one or more embodiments, the linker c0-surfactant surfactant includes a gemini surfactant. In contrast to simple surfactants, which usually consist of a single hydrophilic head and one or two hydrophobic tails, gemini surfactants have two or more head groups and two or more tails.

In general, a gemini surfactant includes at least two hydrophobic chains, at least two ionic or polar groups, and a spacer. The gemini structure may be symmetrical (i.e. the tails are identical and the heads are identical) or unsymmetrical. In one or more embodiments, the gemini surfactant includes three or four tails.

Examples of polar groups include polyethers and sugars. Examples of ionic groups include positive and negative ions. Specific examples of ionic groups include ammonium, phosphate, sulphate, and carboxylate. In one or more embodiments, the head includes one or more sulphate groups.

Examples of spacers include polar and nonpolar groups. Specific examples of spacer groups include amides, short or long methylene groups, stilbene, polyether, aliphatic, and aromatic groups. In one or more embodiments, the spacer includes a hydrocarbon chain methylene group.

In one or more embodiments, gemini surfactants may be represented by the general schematics

1

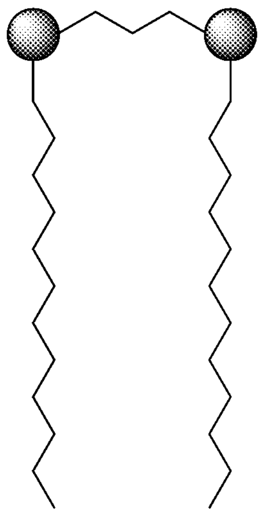

-continued

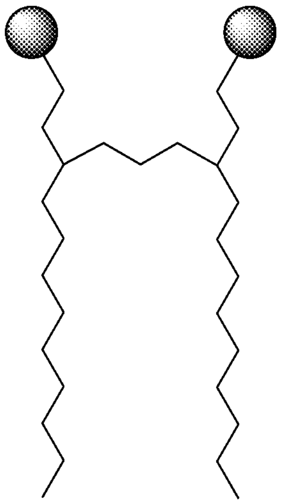

2

Gemini surfactants may be selected for use in the present invention based upon one or more characteristics, such as tail length, degree of branching, ionic nature of the head group, counterion type, number of heads (i.e. dimer, trimer, tetramer, and the like), spacer solubility (i.e. hydrophobic or hydrophilic), spacer length, and the molecular rigidity of the spacer. In a preferred embodiment the Gemini surfactant is a foam inhibiting surfactant such as alkane diols, alkanedicarboxylic acids and esters thereof, such as the commercially-available line of ENVIROGEM® surfactants, available from Air Products and Chemicals, Inc. in Allentown, Pa. Specific examples include EnviroGem® 360, and EnviroGem® AD01.

Gemini surfactants are further described in U.S. Pat. No. 6,710,022, which is incorporated herein by reference.

According to the invention the extended anionic surfactant is the primary surfactant and is present in a ratio of greater than 1:1 percent by weight of anionic extended chain surfactant to linker co-surfactant. In a preferred embodiment the ratio is from about 1.2 to about 5 to 1 ration of anionic extended to linker surfactant.

Cation

The surfactant system as part of a cleaning composition can further comprises a multiply charged cation such as $Mg^{2+}$, $Ca^{2+}$ and/or functional electrolytes such as an alkalinity source or one of more chelating agents when present in a cleaning composition.

The surfactant system of the invention is particularly suited for removal of most greasy and oily soils including the most difficult types of soils, non-transfats when used in a cleaning composion. This removal is accomplished without the need for additional surfactants or alcohol components which can lead to high VOC content. See for example USPTO Patent Application 2006/0211593, ENHANCED SOLUBILIZATION USING EXTENDED CHAIN SURFACTANTS, which describes a system for removal of general soils in which a blend comprising an extended chain nonionic surfactant is mixed with a second surfactant with a high hydrophilic/lipophilic balance index, (HLB) i.e. a surfactant that is more hydrophilic and less lipophilic in character. Examples of such high HLB surfactants are listed as high alkoxylated $C_{8-20}$ alcohols and alkyl phenols. The alkoxylated alcohols may be ethoxylated alcohols, propoxylated alcohols and/or a mixture of ethoxylated/propoxylated alcohols. Contrary to the preceding, applicants have found a synergistic combination of components which improve the cleaning performance without the need for excess surfactants.

Cleaning Compositions Comprising Extended Chain Surfactants

The surfactant system of the invention may be used alone, as a pre-spot or pre-treatment composition in combination with a traditional detergent or cleaner, or may be incorporated within a cleaning composition. The invention comprises both hard surface and soft surface cleaning compositions employing the disclosed surfactant system.

In one embodiment, the invention employs the surfactant system of the invention, an acid source, a solvent, a water conditioning agent, and water to make a hard surface cleaner which will be effective at removing greasy and oily soils from surfaces such as showers, sinks, toilets, bathtubs, countertops, windows, mirrors, transportation vehicles, floors, and the like. These surfaces can be those typified as "hard surfaces" (such as walls, floors, bed-pans).

A typical hard surface formulation at about 18% activity includes between about 40 wt. % and about 80 wt. % surfactant system of the invention, between about 3 wt. % and about 18 wt. % water conditioning agent, between about 0.1 wt. % and about 0.55 wt. % acid source, between about 0 wt % and about 10 wt. % solvent and between about 10 wt. % and about 60 wt. % water.

Particularly, the cleaning compositions include between about 45 wt. % and about 75 wt. % surfactant system of the invention, between about 0 wt. % and about 10 wt. % optional co-surfactant, between about 5 wt. % and about 15 wt. % water conditioning agent, between about 0.3 wt. % and about 0.5 wt. % acid source, between about 0 and about 6 wt. % solvent and between about 15 wt. % and about 50 wt. % water. In other embodiments, similar intermediate concentrations and use concentrations may also be present in the cleaning compositions of the invention.

In a laundry detergent formulation the compositions of the invention typically include the surfactant system of the invention, and a builder, optionally with an enzyme. Examples of such standard laundry detergent ingredients, which are well known to those skilled in the art, are provided in the following paragraphs.

Additional Components

While not essential for the purposes of the present invention, the non-limiting list of additional components illustrated hereinafter are suitable for use in the instant compositions and may be desirably incorporated in certain embodiments of the invention, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable additional materials include, but are not limited to, surfactants, builders, chelating agents, dye transfer inhibiting agents, viscosity modifiers, dispersants, additional enzymes, and enzyme stabilizers, catalytic materials, bleaches, bleach activators, hydrogen peroxide, sources of hydrogen peroxide, preformed peracids, polymeric dispersing agents, threshold inhibitors for hard water precipitation pigments, clay soil removal/anti-redeposition agents, brighteners, suds suppressors, dyes, fabric hueing agents, perfumes, structure elasticizing agents, fabric softeners, carriers, hydrotropes, processing aids, solvents, pigments antimicrobials, pH buffers, processing aids, active fluorescent whitening ingredient, additional surfactants and mixtures thereof. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' compositions. Thus, certain embodiments of Applicants' compositions do not contain additional materials. However, when one or more additional materials are present, such one or more additional components may be present as detailed below:

The liquid detergent herein has a neat pH of from about 7 to about 13, or about 7 to about 9, or from about 7.2 to about 8.5, or from about 7.4 to about 8.2. The detergent may contain a buffer and/or a pH-adjusting agent, including inorganic and/or organic alkalinity sources and acidifying agents such as water-soluble alkali metal, and/or alkali earth metal salts of hydroxides, oxides, carbonates, bicarbonates, borates, silicates, phosphates, and/or metasilicates; or sodium hydroxide, potassium hydroxide, pyrophosphate, orthophosphate, polyphosphate, and/or phosphonate. The organic alkalinity source herein includes a primary, secondary, and/or tertiary amine. The inorganic acidifying agent herein includes HF, HCl, HBr, HI, boric acid, sulfuric acid, phosphoric acid, and/or sulphonic acid; or boric acid. The organic acidifying agent herein includes substituted and substituted, branched, linear and/or cyclic $C_{1-30}$ carboxylic acid.

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C—O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen; (2) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and(3) bleach activators having R—(C—O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Additional Surfactant—In some embodiments, the compositions of the invention include an additional surfactant. Additional surfactants can be anionic, nonionic, cationic zwitterionic and can also include additional extended chain surfactant as discussed herein.

The cleaning composition can contain an additional anionic surfactant component that includes a detersive amount of an anionic surfactant or a mixture of anionic surfactants. Anionic surfactants are desirable in cleaning compositions because of their wetting and detersive properties. The anionic surfactants that can be used according to the invention include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate.

Suitable alkane sulfonates that can be used in the cleaning composition can have an alkane group having 6 to 24 carbon atoms. Suitable alkane sulfonates that can be used include secondary alkane sulfonates. A suitable secondary alkane sulfonate includes sodium $C_{14}$-$C_{17}$ secondary alkyl sulfonate commercially available as Hostapur SAS from Clariant.

Suitable alkyl methyl ester sulfonates that can be used in the cleaning composition include those having an alkyl group containing 6 to 24 carbon atoms. Suitable alpha olefin sulfonates that can be used in the cleaning composition include those having alpha olefin groups containing 6 to 24 carbon atoms.

Suitable alkyl ether sulfates that can be used in the cleaning composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauryl ether sulfate and is available under the name Steol CS-460.

Suitable alkyl sulfates that can be used in the cleaning composition include those having an alkyl group containing 6 to 24 carbon atoms. Suitable alkyl sulfates include, but are not limited to, sodium lauryl sulfate and sodium lauryl/myristyl sulfate.

Suitable alcohol sulfates that can be used in the cleaning composition include those having an alcohol group containing about 6 to about 24 carbon atoms.

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine. If a mixture of salts is used, a suitable mixture of alkaline metal salt can be sodium and magnesium, and the molar ratio of sodium to magnesium can be between about 3:1 and about 1:1.

The cleaning composition, when provided as a concentrate, can include the additional anionic surfactant component in an amount sufficient to provide a use composition having desired wetting and detersive properties after dilution with water. The concentrate can contain about 0.1 wt. % to about 0.5 wt. %, about 0.1 wt. % to about 1.0 wt. %, about 1.0 wt. % to about 5 wt. %, about 5 wt. % to about 10 wt. %, about 10 wt. % to about 20 wt. %, 30 wt. %, about 0.5 wt. % to about 25 wt. %, and about 1 wt. % to about 15 wt. %, and similar intermediate concentrations of the anionic surfactant.

The cleaning composition can contain a nonionic surfactant component that includes a detersive amount of nonionic surfactant or a mixture of nonionic surfactants. Nonionic surfactants can be included in the cleaning composition to enhance grease removal properties. Although the surfactant component can include a nonionic surfactant component, it should be understood that the nonionic surfactant component can be excluded from the detergent composition.

Additional nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt %.

Other nonionic surfactants include alcohol alkoxylates. An suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the detergent composition concentrate, they can be included in an amount of at least about 0.1 wt. % and can be included in an amount of up to about 15 wt. %. The concentrate can include about 0.1 to 1.0 wt. %, about 0.5 wt. % to about 12 wt. % or about 2 wt. % to about 10 wt. % of the nonionic surfactant.

Amphoteric surfactants can also be used to provide desired detersive properties. Suitable amphoteric surfactants that can be used include, but are not limited to: betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the detergent composition includes an amphoteric surfactant, the amphoteric surfactant can be included in an amount of about 0.1 wt % to about 15 wt %. The concentrate can include about 0.1 wt % to about 1.0 wt %, 0.5 wt % to about 12 wt % or about 2 wt % to about 10 wt % of the amphoteric surfactant.

The cleaning composition can contain a cationic surfactant component that includes a detersive amount of cationic surfactant or a mixture of cationic surfactants. Cationic co-surfactants that can be used in the cleaning composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride.

Builders—The cleaning compositions of the present invention may comprise one or more detergent builders or builder systems. When a builder is used, the subject composition will typically comprise at least about 1%, from about 5% to about 60% or even from about 10% to about 40% builder by weight of the subject composition. The detergent may contain an inorganic or organic detergent builder which counteracts the effects of calcium, or other ion, water hardness. Examples include the alkali metal citrates, succinates, malonates, carboxymethyl succinates, carboxylates, polycarboxylates and polyacetyl carboxylate; or sodium, potassium and lithium salts of oxydisuccinic acid, mellitic acid, benzene polycarboxylic acids, and citric acid; or citric acid and citrate salts. Organic phosphonate type sequestering agents such as DEQUEST® by Monsanto and alkanehydroxy phosphonates are useful. Other organic builders include higher molecular weight polymers and copolymers, e.g., polyacrylic acid, polymaleic acid, and polyacrylic/polymaleic acid copolymers and their salts, such as SOKALAN® by BASF. Generally, the builder may be up to 30%, or from about 1% to about 20%, or from about 3% to about 10%.

The compositions may also contain from about 0.01% to about 10%, or from about 2% to about 7%, or from about 3% to about 5% of a $C_{8-20}$ fatty acid as a builder. The fatty acid can also contain from about 1 to about 10 EO units. Suitable fatty acids are saturated and/or unsaturated and can be obtained from natural sources such a plant or animal esters (e.g., palm kernel oil, palm oil, coconut oil, babassu oil, safflower oil, tall oil, tallow and fish oils, grease, and mixtures thereof), or synthetically prepared (e.g., via the oxidation of petroleum or by hydrogenation of carbon monoxide via the Fisher Tropsch process). Useful fatty acids are saturated $C_{12}$ fatty acid, saturated $C_{12-14}$ fatty acids, saturated or unsaturated $C_{12-18}$ fatty acids, and a mixture thereof. Examples of suitable saturated fatty acids include captic, lauric, myristic, palmitic, stearic, arachidic and behenic acid. Suitable unsaturated fatty acids include: palmitoleic, oleic, linoleic, linolenic and ricinoleic acid.

Chelating Agents—The cleaning compositions herein may contain a chelating agent. Suitable chelating agents include copper, iron and/or manganese chelating agents and mixtures thereof. When a chelating agent is used, the subject composition may comprise from about 0.005% to about 15% or even from about 3.0% to about 10% chelating agent by weight of the subject composition.

Dye Transfer Inhibiting Agents—The cleaning compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Optical Brightener—In some embodiments, an optical brightener component, may be present in the compositions of the present invention. The optical brightener can include any brightener that is capable of eliminating graying and yellowing of fabrics. Typically, these substances attach to the fibers and bring about a brightening and simulated bleaching action by converting invisible ultraviolet radiation into visible longer-wave length light, the ultraviolet light absorbed from sunlight being irradiated as a pale bluish fluorescence and, together with the yellow shade of the grayed or yellowed laundry, producing pure white.

Fluorescent compounds belonging to the optical brightener family are typically aromatic or aromatic heterocyclic materials often containing condensed ring systems. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.).

Optical brighteners useful in the present invention are known and commercially available. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene. In an embodiment, optical brighteners include stilbene derivatives.

In some embodiments, the optical brightener includes Tinopal UNPA, which is commercially available through the Ciba Geigy Corporation located in Switzerland.

Additional optical brighteners for use in the present invention include, but are not limited to, the classes of substance of 4,4'-diamino-2,2'-stilbenedisulfonic acids (flavonic acids), 4,4'-distyrylbiphenyls, methylumbelliferones, coumarins, dihydroquinolinones, 1,3-diarylpyrazolines, naphthalimides, benzoxazol, benzisoxazol and benzimidazol systems, and pyrene derivatives substituted by heterocycles, and the like. Suitable optical brightener levels include lower levels of from about 0.01, from about 0.05, from about 0.1 or even from about 0.2 wt % to upper levels of 0.5 or even 0.75 wt %.

Dispersants—The compositions of the present invention can also contain dispersants. Suitable water-soluble organic materials include the homo- or co-polymeric acids or their salts, in which the polycarboxylic acid comprises at least two carboxyl radicals separated from each other by not more than two carbon atoms.

Additional Enzymes—The cleaning compositions can comprise one or more enzymes which provide cleaning performance and/or fabric care benefits. Enzymes can be included herein for a wide variety of fabric laundering purposes, including removal of protein-based, carbohydrate-based, or triglyceride-based stains, for example, and/or for fabric restoration. Examples of suitable enzymes include, but are not limited to, hemicellulases, peroxidases, proteases, cellulases, xylanases, lipases, phospholipases, esterases, cutinases, pectinases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, or combinations thereof and may be of any suitable origin. The choice of enzyme(s) takes into account factors such as pH-activity, stability optima, thermostability, stability versus active detergents, chelants, builders, etc. A detersive enzyme mixture useful herein is a protease, lipase, cutinase and/or cellulase in conjunction with amylase. Sample detersive enzymes are described in U.S. Pat. No. 6,579,839.

Enzymes are normally present at up to about 5 mg, more typically from about 0.01 mg to about 3 mg by weight of active enzyme per gram of the detergent. Stated another way, the detergent herein will typically contain from about 0.001% to about 5%, or from about 0.01% to about 2%, or from about 0.05% to about 1% by weight of a commercial enzyme preparation. Protease enzymes are present at from about 0.005 to about 0.1 AU of activity per gram of detergent. Proteases useful herein include those like subtilisins from *Bacillus* [e.g. *subtilis, lentus, licheniformis, amyloliquefaciens* (BPN, BPN'), *alcalophilus*,] e.g. Esperase®, Alcalase®, Everlase® and Savinase® (Novozymes), BLAP and variants (Henkel). Further proteases are described in EP 130756, WO 91/06637, WO 95/10591 and WO 99/20726.

Amylases are described in GB Pat. #1 296 839, WO 94/02597 and WO 96/23873; and available as Purafect Ox Am® (Genencor), Termamyl®, Natalase®, Ban®, Fungamyl®, Duramyl® (all Novozymes), and RAPIDASE (International Bio-Synthetics, Inc).

The cellulase herein includes bacterial and/or fungal cellulases with a pH optimum between 5 and 9.5. Suitable cellulases are disclosed in U.S. Pat. No. 4,435,307 to Barbesgoard, et al., issued Mar. 6, 1984. Cellulases useful herein include bacterial or fungal cellulases, e.g. produced by Humicola insolens, particularly DSM 1800, e.g. 50 kD and ~43 kD (Carezyyme®). Additional suitable cellulases are the EGIII cellulases from *Trichoderma longibrachiatum*. WO 02/099091 by Novozymes describes an enzyme exhibiting endo-beta-glucanase activity (EC 3.2.1.4) endogenous to *Bacillus* sp., DSM 12648; for use in detergent and textile applications; and an anti-redeposition endo-glucanase in WO 04/053039. Kao's EP 265 832 describes alkaline cellulase K, CMCase I and CMCase II isolated from a culture product of *Bacillus* sp KSM-635. Kao further describes in EP 1 350 843 (KSM 5237; 1139; KSM 64; KSM N131), EP 265 832A (KSM 635, FERM BP 1485) and EP 0 271 044 A (KSM 534, FERM BP 1508; KSM 539, FERM BP 1509; KSM 577, FERM BP 1510; KSM 521, FERM BP 1507; KSM 580, FERM BP 1511; KSM 588, FERM BP 1513; KSM 597, FERM BP 1514; KSM 522, FERM BP 1512; KSM 3445, FERM BP 1506; KSM 425. FERM BP 1505) readily-mass producible and high activity alkaline cellulases/endo-glucanases for an alkaline environment. Such endo-glucanase may contain a polypeptide (or variant thereof) endogenous to one of the above *Bacillus* species. Other suitable cellulases are Family 44 Glycosyl Hydrolase enzymes exhibiting endo-beta-1,4-glucanase activity from *Paenibacilus polyxyma* (wild-type) such as XYG1006 described in WO 01/062903 or variants thereof. Carbohydrases useful herein include e.g. mannanase (see, e.g., U.S. Pat. No. 6,060,299), pectate lyase (see, e.g., WO99/27083), cyclomaltodextrin glucanotransferase (see, e.g., WO96/33267), and/or xyloglucanase (see, e.g., WO99/02663). Bleaching enzymes useful herein with enhancers include e.g. peroxidases, laccases, oxygenases, lipoxygenase (see, e.g., WO 95/26393), and/or (non-heme) haloperoxidases.

Suitable lipases include those produced by *Pseudomonas* and *Chromobacter*, and LIPOLASE®, LIPOLASE ULTRA®, LIPOPRIME® and LIPEX® from Novozymes. See also Japanese Patent Application 53-20487, laid open on Feb. 24, 1978, available from Areario Pharmaceutical Co. Ltd., Nagoya, Japan, under the trade name Lipase P "Amano". Other commercial lipases include Amano-CES, lipases ex *Chromobacter viscosum*, available from Toyo Jozo Co., Tagata, Japan; and *Chromobacter viscosum* lipases from U.S. Biochemical Corp., U.S.A. and Diosynth Co., The Netherlands, and lipases ex *Pseudomonas gladioli*. Also suitable are cutinases [EC 3.1.1.50] and esterases.

Enzymes useful for liquid detergent formulations, and their incorporation into such formulations, are disclosed in U.S. Pat. No. 4,261,868 to Hora, et al., issued Apr. 14, 1981. In an embodiment, the liquid composition herein is substantially free of (i.e. contains no measurable amount of) wild-type protease enzymes. A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers—Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

A useful enzyme stabilizer system is a calcium and/or magnesium compound, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth) acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof. The detergent may contain a reversible protease inhibitor e.g., peptide or protein type, or a modified subtilisin inhibitor of family VI and the plasminostrepin; leupeptin, peptide trifluoromethyl ketone, or a peptide aldehyde. Enzyme stabilizers are present from about 1 to about 30, or from about 2 to about 20, or from about 5 to about 15, or from about 8 to about 12, millimoles of stabilizer ions per liter.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof. In some embodiments, the solvent includes water. The water can include water from any source including deionized water, tap water, softened water, and combinations thereof. Solvents are typically present at from about 0.1% to about 50%, or from about 0.5% to about 35%, or from about 1% to about 15% by weight.

Form of the Compositions

The detergent compositions of the present invention may be of any suitable form, including paste, liquid, solid (such as tablets, powder/granules), foam or gel, with powders and tablets being preferred. The composition may be in the form of a unit dose product, i.e. a form which is designed to be used as a single portion of detergent composition in a washing operation. Of course, one or more of such single portions may be used in a cleaning operation.

Solid forms include, for example, in the form of a tablet, rod, ball or lozenge. The composition may be a particulate form, loose or pressed to shape or may be formed by injection moulding or by casting or by extrusion. The composition may be encased in a water soluble wrapping, for, example of PVOH or a cellulosic material. The solid product may be provided as a portioned product as desired.

The composition may also be in paste, gel or liquid form, including unit dose (portioned products) products. Examples include a paste, gel or liquid product at least partially surrounded by, and preferably substantially enclosed in a water-soluble coating, such as a polyvinyl alcohol package. This package may for instance take the form of a capsule, a pouch or a moulded casing (such as an injection moulded casing) etc. Preferably the composition is substantially surrounded by such a package, most preferably totally surrounded by such a package. Any such package may contain one or more product formats as referred to herein and the package may contain one or more compartments as desired, for example two, three or four compartments.

If the composition is a foam, a liquid or a gel it is preferably an aqueous composition although any suitable solvent may be used. According to an especially preferred embodiment of the present invention the composition is in the form of a tablet, most especially a tablet made from compressed particulate material.

If the compositions are in the form of a viscous liquid or gel they preferably have a viscosity of at least 50 mPas when measured with a Brookfield RV Viscometer at 25° C. with Spindle 1 at 30 rpm.

The compositions of the invention will typically be used by placing them in a detergent dispenser e.g. in a dishwasher machine draw or free standing dispensing device in an automatic dishwashing machine. However, if the composition is in the form of a foam, liquid or gel then it may be applied to by any additional suitable means into the dishwashing machine, for example by a trigger spray, squeeze bottle or an aerosol.

Processes of Making Cleaning Compositions

The compositions of the invention may be made by any suitable method depending upon their format. Suitable manufacturing methods for detergent compositions are well known in the art, non-limiting examples of which are described in U.S. Pat. Nos. 5,879,584; 5,691,297; 5,574,005; 5,569,645; 5,565,422; 5,516,448; 5,489,392; and 5,486,303. Various techniques for forming detergent compositions in solid forms are also well known in the art, for example, detergent tablets may be made by compacting granular/particular material and may be used herein.

In one aspect, the liquid detergent compositions disclosed herein may be prepared by combining the components thereof in any convenient order and by mixing, e.g., agitating, the resulting component combination to form a phase stable liquid detergent composition. In one aspect, a liquid matrix is formed containing at least a major proportion, or even substantially all, of the liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

Reduction of Smoking in Laundry Fabrics

There have been reports of undesirable smoking issues for laundry particularly when a washed fabric comes in contact with a hot iron. This is due to a switch from nonyl phenol ethoxylate (NPE) based detergents to alcohol phenol ethoxylate (APE) based detergents. The problem is due to the residual unreacted long chain alcohols which are highly soluble in APE based detergents. It is well known in the surfactant industry that APEs are more monodisperse and have less unreacted alcohol than the AEs, because the starting alkyl phenols are more reactive than the starting linear alcohols. The use solution cannot suspend all the highly insoluble unreacted alcohol, which deposits onto a washed fabric and can cause smoking when the fabric comes in contact with a hot iron.

The extended surfactants and microemulsions of the present invention undergo two steps of alkoxylation (first propoxylation or butoxylation, then followed with ethoxylation) and therefore have reduced levels of residual (unreacted) alcohol, specifically below 0.1%. Thus after the laundry process, the extended surfactants and microemulsions of the present invention leave less residue from the highly insoluble long chain alcohols onto the washed fabric, which in turn greatly reduces the smoking when these washed fabrics come in contact with hot irons.

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. All references cited herein are hereby incorporated in their entirety by reference.

EXAMPLES

Micro-Emulsion Study with Anionic Surfactants/Extended Surfactants i) Anionic Surfactant with Novel Co-Surfactant Sensiva SC50 is an ethylhexyl glycerol ether commercially available from S' chtilke UK Cygnet House, Meadowhall, UK

TABLE 1

Sodium Lauryl Ether Sulfate (SLES) with Alkyl Glycerol Ether (AGE), or Alkyl Glycerol Ether with Low moles of Ethoxylation as co-surfactant SLES-AGE Microemulsion Study.

| | Wt(g) | Wt(g) | Wt(g) | Wt(g) | Wt(g) | Wt(g) | Wt(g) | Wt(g) | Wt(g) |
|---|---|---|---|---|---|---|---|---|---|
| Soybean Oil | 12.00 | 12.00 | 12.00 | 12.00 | 12.00 | 12.00 | 12.00 | 12.00 | 12.00 |
| Water (0.13% NaCl) | 12.00 | 12.00 | 12.00 | 12.00 | 12.00 | 12.00 | 12.00 | 12.00 | 12.00 |
| SLES (70% Active) | 10.00 | 10.00 | 10.00 | 5.00 | 5.00 | 5.00 | 5.00 | 5.00 | 5.00 |
| Sensiva SC 50 | 2.00 | | | 1.00 | | | 5.00 | | |
| AGE-1EO | | 2.00 | | | 1.00 | | | 5.00 | |
| AGE-3EO | | | 2.00 | | | 1.00 | | | 5.00 |
| Microemulsion | NO | NO | NO | NO | NO | NO | NO | NO | NO |
| | | Thick Paste | | | Thick Paste | | | Phase sep @ RT | |

Sodium Lauryl Ether Sulfate only forms thick white paste. Hydrogen bonding between the ether sulfate group and water causes gellation, and paste formation with soybean oil.

From table 1 is can be seen that a high level of alkyl glycerol ether, or alkyl glycerol ether with low moles of EO reduces hydrogen bonding through micellar interaction/interfacial stacking.

ii) Anionic Extended Surfactant with Short PO Chain and Novel Co-Surfactant

Marlowet 4539 is a $C_9$-alcohol polyethylene glycol ether carboxylic acid (2PO)) commercially available from Sasol Olefins and surfactants Johannesburg, South Africa

TABLE 2

Anionic Extended Surfactant Marlowet 4539 (Neutralized) (2PO) with Novel Co-surfactant

| | Wt(g) | Wt(g) | Wt(g) | Wt(g) | Wt(g) | Wt(g) | Wt(g) | Wt(g) |
|---|---|---|---|---|---|---|---|---|
| Soybean Oil | 12.00 | 12.00 | 12.00 | 12.00 | 12.00 | 12.00 | 12.00 | 12.00 |
| Water (0.13% NaCl) | 12.00 | 12.00 | 12.00 | 12.00 | 12.00 | 12.00 | 12.00 | 12.00 |
| Marlowet 4539 | 10.00 | 10.00 | 10.00 | 9.00 | 9.00 | 9.00 | 8.00 | 8.00 |
| Sensiva SC 50 | 2.00 | | | 3.00 | | | 4.00 | |
| AGE 1EO | | 2.00 | | | 3.00 | | | 4.00 |
| AGE 3EO | | | 2.00 | | | 3.00 | | |
| Microemulsion | NO | NO | NO | NO | NO | NO | NO | NO |
| Notes | WL | WL | WL | WL | WP | WP | WP | WP |

| | Wt(g) | Wt(g) | Wt(g) | Wt(g) | Wt(g) | Wt(g) | Wt(g) |
|---|---|---|---|---|---|---|---|
| Soybean Oil | 12.00 | 12.00 | 12.00 | 12.00 | 12.00 | 12.00 | 12.00 |
| Water (0.13% NaCl) | 12.00 | 12.00 | 12.00 | 12.00 | 12.00 | 12.00 | 12.00 |
| Marlowet 4539 | 8.00 | 7.00 | 7.00 | 7.00 | 6.00 | 6.00 | 6.00 |
| Sensiva SC 50 | | 5.00 | | | 6.00 | | |
| AGE 1EO | | | 5.00 | | | 6.00 | |
| AGE 3EO | 4.00 | | | 5.00 | | | 6.00 |
| Microemulsion | NO | NO | NO | NO | NO | NO | NO |
| Notes | WP | WP | WP | WP | WP | WP | WP |

WL: WHITE LIQUID

WP: WHITE PASTE

From the table one can see that the extended surfactant (Marlowet) is more effective in reducing hydrogen bonding and gellation, even with low moles of PO extension. Ethoxylation on alkyl glycerol ether promotes hydrogen bonding. The combination of extended surfactant and (unexthoxylated) alkyl glycerol ether, with the former being the main (higher proportion) surfactant and the latter being the (lower proportion) co-surfactant, is best in reducing hydrogen bonding and gellation, and paste formation with triglyceride.

TABLE 3

Anionic Extended Surfactant Steol KS-460 (alcohol ethoxy sulfate with about 2 moles of PO extension) with Novel Co Surfactants
Microemulsion Study with Stepan Steol KS-460 + Novel Co-Surfactants (AGE, AE, Gemini)
Anionic Extended Surfactant Steol KS-460 (59.5%)

| | wt (g) | wt (g) | wt (g) | wt (g) | wt (g) | wt (g) | wt (g) | wt (g) | wt (g) | wt (g) |
|---|---|---|---|---|---|---|---|---|---|---|
| DI water (0.13% NaCl) | 6.00 | 6.00 | 6.00 | 6.00 | 6.00 | 6.00 | 6.00 | 6.00 | 6.00 | 6.00 |
| Soybean Oil | 6.00 | 6.00 | 6.00 | 6.00 | 6.00 | 6.00 | 6.00 | 6.00 | 6.00 | 6.00 |
| Steol KS-460 (59.5%) | 4.00 | 4.00 | 4.00 | 4.00 | 4.00 | 4.00 | 4.00 | 4.00 | 4.00 | 4.00 |
| Sensiva SC 50 | 1.00 | | | | | 2.00 | | | | |
| AGE 1EO | | 1.00 | | | | | 2.00 | | | |
| AGE 3EO | | | 1.00 | | | | | 2.00 | | |
| Tomadol 91-2.5 | | | | 1.00 | | | | | 2.00 | |
| Envirogem 360 | | | | | 1.00 | | | | | 2.00 |
| Microemulsion | Liquid white emulsion, 2 phase separation at lower temperature. | | | | | | | | | |

** Steol KS-460 alone forms thick white paste.

iii) Anionic Extended Surfactant (X-AES) ($C_{12-14}$-$(PO)_{16}$-$(EO)_2$-sulfate) and Novel Co-Surfactant Tomadol 91-2 is an ethoxylated alcohol surfactant (5EO) available from Air Products and Chemicals, Inc. Allentown PA.

Envirogem 360 and Envirogem ADO1 are Gemini surfactants commercially avaible from Air Products and Chemicals, Inc. Allentown PA.

TABLE 4

MICROEMULSION STUDY X-AES in Soybean Oil

| RATIO (X-AES/Co-Surf.) | Surfactant | Structure | Microemulsion Range | Consistency |
|---|---|---|---|---|
| *10/2 | Alkyl Glycerol Ethers | Ethylhexyl Glycerol Ether | 125-100 F., 80-RT | Liquid, GEL |
| | | Ethylhexyl Glycerol Ether 1EO | 160-125 F., 105-85 F. | Liquid, GEL |
| | | Ethylhexyl Glycerol Ether 3EO | 130-115 F. | PASTE |
| *10/3 | Alcohol Ethoxylates | Tomadol 91-2.5EO | 138-110 F., 95-RT | Liquid, GEL |
| | | C10 Alcohol | 85-RT (CLOSE) | GEL |
| *10/3 | Gemini (Air products) | Envirogem 360 | 120-RT | Liquid |
| | | Envirogem AD01 | 120-110 F. | GEL |

From Table 4 one can see that a long enough block of PO extension (16) is most effective in reducing hydrogen bonding. More importantly, it allows the formation of microemulsions.

TABLE 5

| Microemulsion: X-AES With Novel Co-surfactants (weight % of active components) | | | | | | | | | | | | | | | | |
|---|---|---|---|---|---|---|---|---|---|---|---|---|---|---|---|---|
| | | wt % | wt % | wt % | wt % | wt % | wt % | wt % | wt % | wt % | wt % | wt % | wt % | wt % | wt % | wt % |
| DI Water (0.13% NaCl) | 43.0 | 17.0 | 17.0 | 17.0 | 33.0 | 33.0 | 33.0 | 42.0 | 42.0 | 42.0 | 33.0 | 33.0 | 33.0 | 41.0 | 41.0 | 41.0 |
| Soybean Oil | 43.0 | 33.0 | 33.0 | 33.0 | 33.0 | 33.0 | 33.0 | 42.0 | 42.0 | 42.0 | 33.0 | 33.0 | 33.0 | 41.0 | 41.0 | 41.0 |
| X-AES | 14.0 | 28.0 | 28.0 | 28.0 | 28.0 | 28.0 | 28.0 | 13.0 | 13.0 | 13.0 | 11.0 | 11.0 | 11.0 | 14.0 | 14.0 | 14.0 |
| Sensiva SC50 | | 22.0 | | | 6.0 | | | 3.0 | | | 22.0 | | | | | |
| AGE 1EO | | | 22.0 | | | 6.0 | | | 3.0 | | | 22.0 | | | | |
| AGE 3EO | | | | 22.0 | | | 6.0 | | | 3.0 | | | 22.0 | | | |
| Tomadol 91-2.5 | | | | | | | | | | | | | | 4.0 | | |
| Envirogem 360 | | | | | | | | | | | | | | | 4.0 | |
| Envirogem AD01 | | | | | | | | | | | | | | | | 4.0 |
| Microemulsion | N | Y | Y | Y | Y | Y | Y | Y | Y | Y | N | N | N | Y | Y | Y |
| | | | | | | | | | | | | 3 phase emulsion at RT | | | | |

From Table 5 one can see that the X-AES alone will not form a microemulsion, while the addition of the co surfactants allows a microemulsion to form. When the co surfactant amount exceeds that of the extended chain surfactant the ability to form a microemulsion is negatively impacted.

FIG. 1 is a microemulsion plot of anionic extended surfactant (X-AES) with co-surfactant ethylhexyl glycerine ether over various temperatures. One can see the advantage of ethoxylation.

Figure 2:
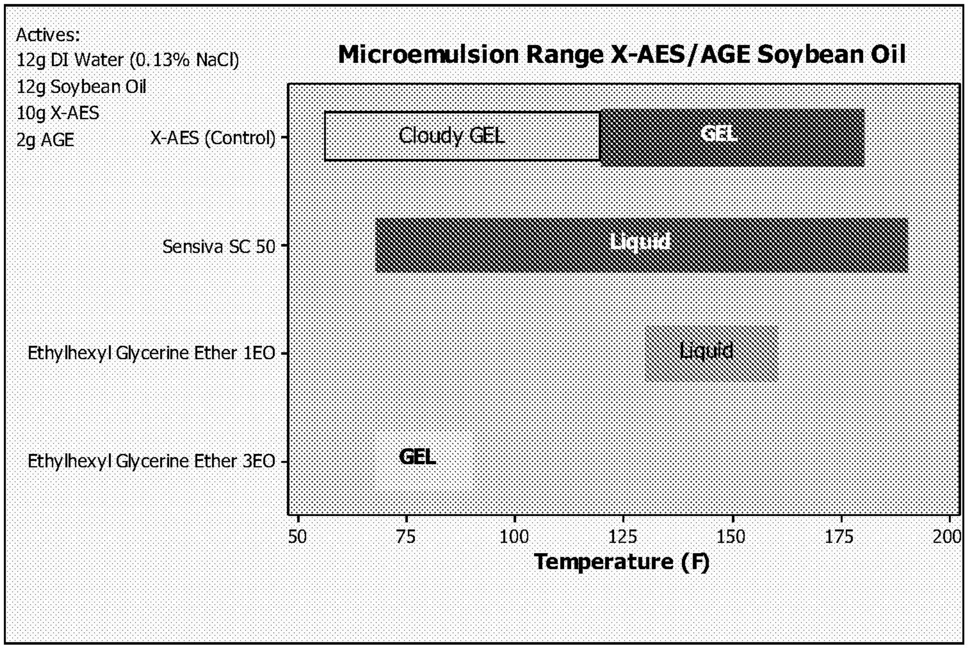
FIG. 2 is an anionic extended surfactant (X-AES) with co-surfactant ethylhexyl glycerine ether.

FIG. 2 is a anionic extended surfactant (X-AES) with co-surfactant ethylhexyl glycerine ether.

Figure 3:
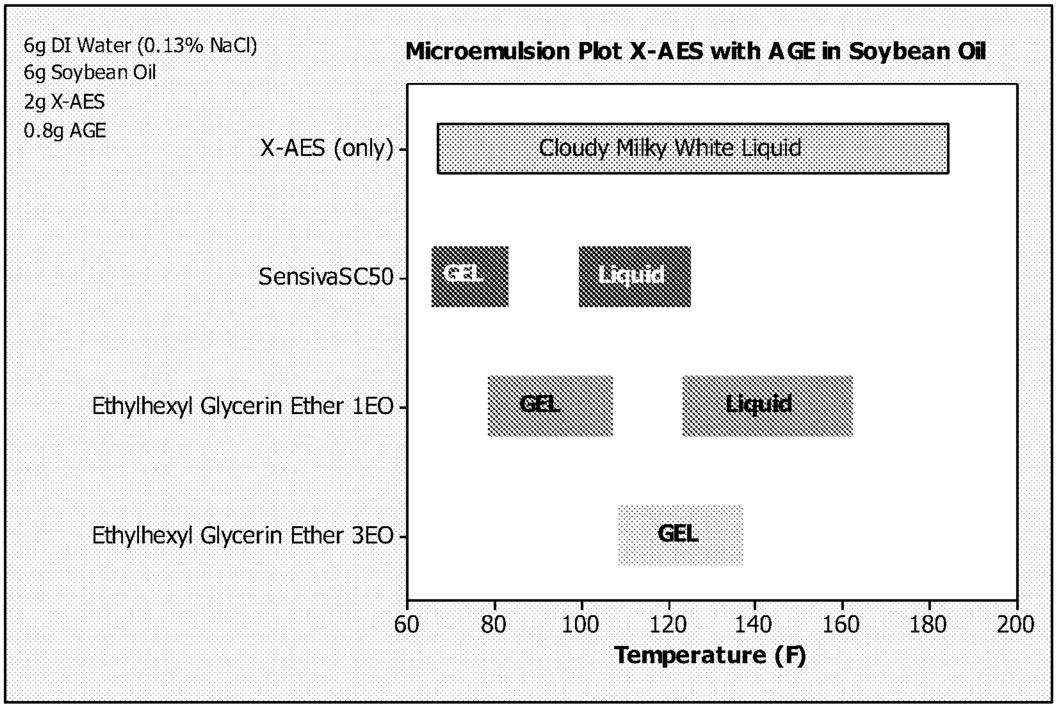
FIG. 3 is an anionic extended surfactant (X-AES) with co-surfactant ethylhexyl glycerine ether.

FIG. 3 is a anionic extended surfactant (X-AES) with co-surfactant ethylhexyl glycerine ether.

Figure 4:
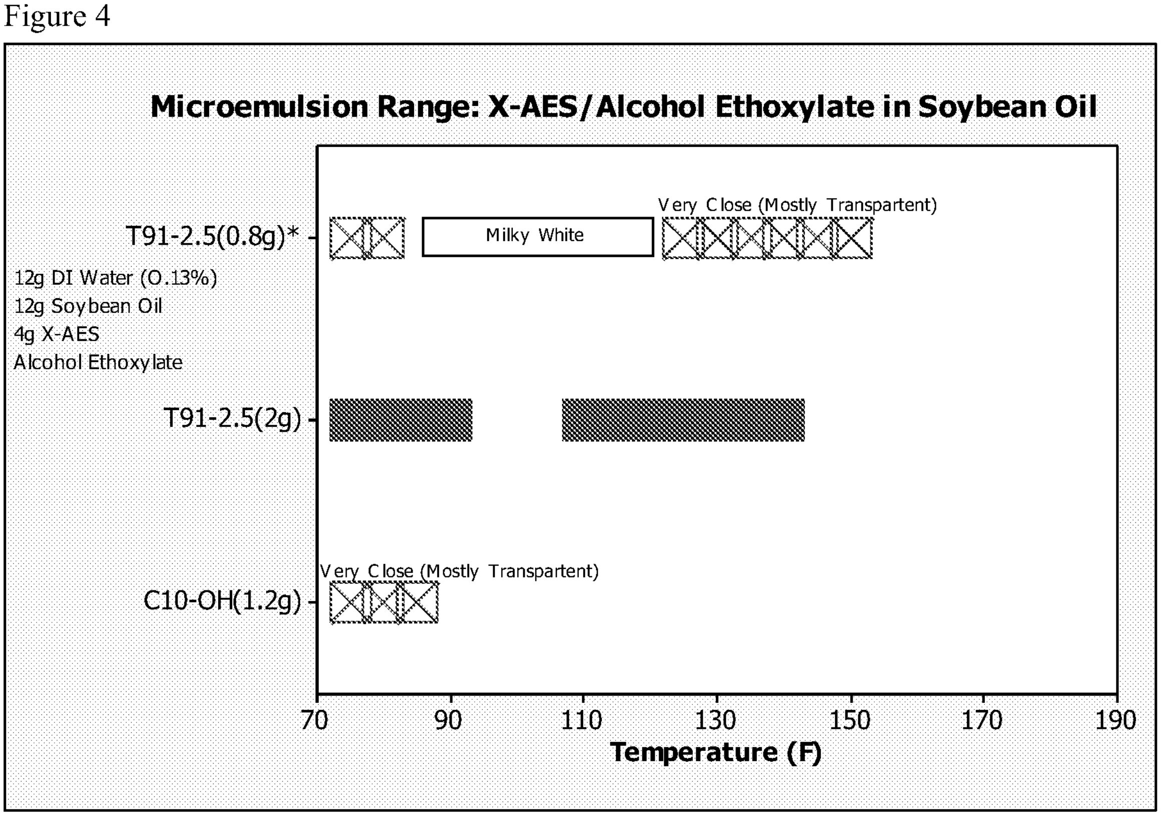
FIG. 4 is a microemulsion plot of anionic extended surfactant (X-AES) with co-surfactant alcohol ethoxylate over various temperatures.

FIG. 4 is a microemulsion plot of anionic extended surfactant (X-AES) with co-surfactant alcohol ethoxylate over various temperatures.

Figure 5:
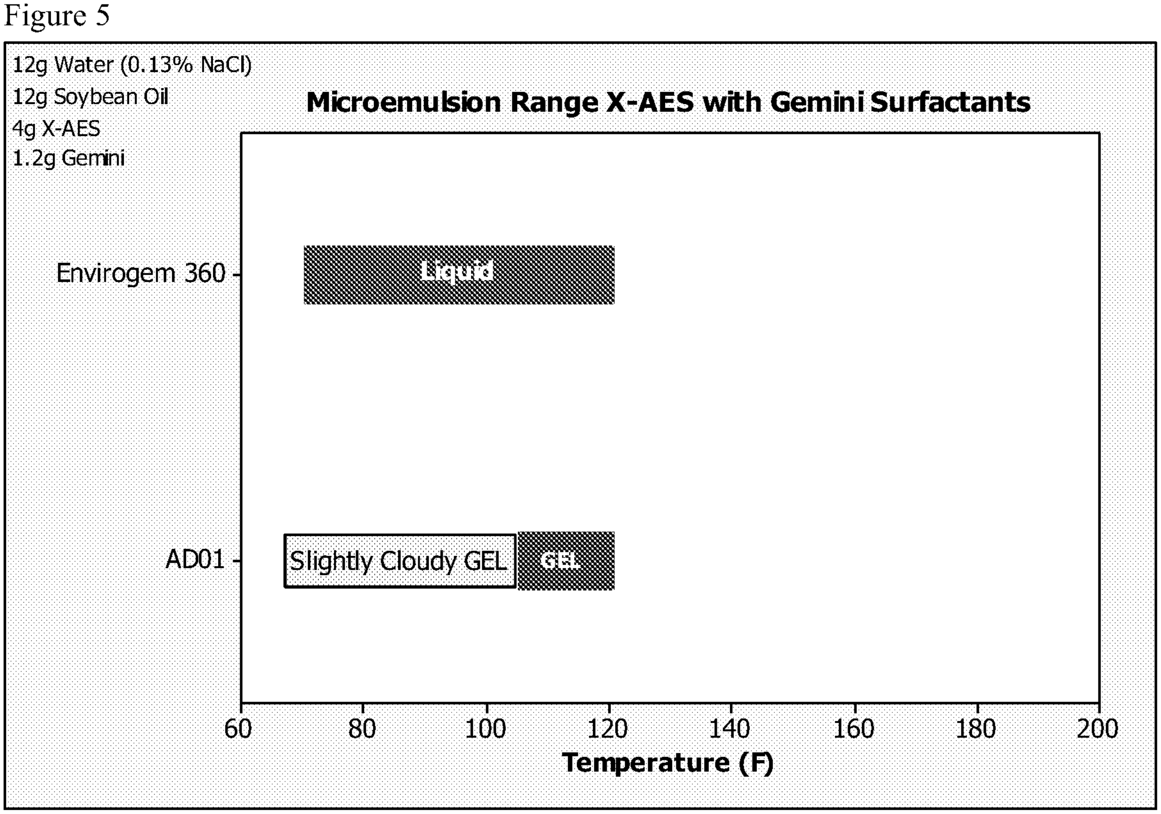
FIG. 5 is a microemulsion plot of anionic extended surfactant (X-AES) with co-surfactant Gemini surfactants over various temperatures.

FIG. 5 is a microemulsion plot of anionic extended surfactant (X-AES) with co-surfactant Gemini surfactants over various temperatures.

TABLE 6

| Microemulsion: Extended (PO) Anionic Surfactants With Co-surfactants (Mass of active components) | | | | | | | | | | |
|---|---|---|---|---|---|---|---|---|---|---|
| microemulsion | EXP 1 | EXP 2 | EXP 3 | EXP 4 | EXP 5 | EXP 6 | EXP 7 | EXP 8 | EXP 9 | EXP 10 |
| Soybean Oil | 3 g | 3 g | 3 g | 3 g | 3 g | 3 g | 3 g | 3 g | 3 g | 3 g |
| 5 gpg Water | 3 g | 3 g | 3 g | 3 g | 3 g | 3 g | 3 g | 3 g | 3 g | 3 g |
| L12-(PO)4-SO4 | 1 g | | | | | 1 g | | | | |
| L14-(PO)4-SO4 | | 1 g | | | | | 1 g | | | |
| L16-(PO)4-SO4 | | | 1 g | | | | | 1 g | | |
| L12-(PO)8-SO4 | | | | 1 g | | | | | 1 g | |
| L14-(PO)8-SO4 | | | | | 1 g | | | | | 1 g |
| Sensiva | 0.3 g | 0.3 g | 0.3 g | 0.3 g | 0.3 g | | | | | |
| EH-3 | | | | | | 1.0 g | 1.0 g | 1.0 g | 1.0 g | 1.0 g |
| Microemulsion | N | N | N | N | N | N | N | N | N | N |
| Temperature | | | | | | | | | | |
| microemulsion | EXP 11 | EXP 12 | EXP 13 | EXP 14 | EXP 15 | EXP 16 | EXP 17 | EXP 18 | EXP 19 | EXP 20 |
| Soybean Oil | 3 g | 3 g | 3 g | 3 g | 3 g | 3 g | 3 g | 3 g | 3 g | 3 g |
| 5 gpg Water | 3 g | 3 g | 3 g | 3 g | 3 g | 3 g | 3 g | 3 g | 3 g | 3 g |
| L12-(PO)4-SO4 | 1 g | | | | | 1 g | | | | |
| L14-(PO)4-SO4 | | 1 g | | | | | 1 g | | | |
| L16-(PO)4-SO4 | | | 1 g | | | | | 1 g | | |
| L12-(PO)8-SO4 | | | | 1 g | | | | | 1 g | |
| L14-(PO)8-SO4 | | | | | 1 g | | | | | 1 g |
| Sensiva | 0.3 g | 0.3 g | 0.3 g | 0.3 g | 0.3 g | | | | | |
| EH-3 | 1.0 g | 1.0 g | 1.0 g | 1.0 g | 1.0 g | 2.0 g | 2.0 g | 2.0 g | 2.0 g | 2.0 g |
| Microemulsion | N | N | N | Y | Y | N | N | N | N | Y |
| Temperature | | | | 155-140 | 165-130 | | | | | 150-100 |

iv) Lard/Fatty Soil Removal Experiment

Fatty soil removal test: 50 g Lard+30 g of IPA added+dash of Sudan IV red dye.

Soiling—

SS304 Coupon (3×5 in)

Glass Coupon (1×2 in)

*Soil is solid at room temperature, heat in microwave for 15 seconds before applying.

Test Procedure

1) Clean coupons detergent in 5 gpg water. Rinse with Acetone, followed by DI water and let air dry.
2) One dry, pre mass coupons with analytical balance.
3) Mass by difference technique. Using a disposable pipette, apply soil evenly to the bottom half of coupon. 0.5 g for light soil, and 1.0 g for heavy soil. Let soiled coupons sit overnight for IPA to evaporate.
4) Mass soiled coupons with analytical balance.
5) Prepare 1 L sample solutions (each sample is tested in duplicate) at 0.4 oz/gal in water at 110 F.
6) Place coupons in test solution with soil side down at near 45 degree angle in container.
7) Using a 1 inch stir bar, stir solution at 200 rpm for 5 minutes. Maintain temperature at 110 F over the duration of the experiment.
8) Remove coupons from solution and let sit overnight.
9) Mass coupons after cleaning. Calculate percent weight loss.

Table 7 shows a soil removal experiment with the composition of the invention

Surfactant Package Replacement

| Commercial Product A | | | |
|---|---|---|---|
| | 5 | Percent | Surfactant Premix |
| 170149 | 16.67 | Percent | Alcohol (C11) 3EO |
| 173567 | 83.33 | Percent | Linear C12-C16 Alcohol 7EO |
| Experimental Formula | | | |
| | 5 | Percent | Surfactant Premix |
| 170149 | 16.67 | Percent | Tomadol 91-2.5 |
| 173567 | 83.33 | Percent | Surfonic X-AES |

Figure 6:
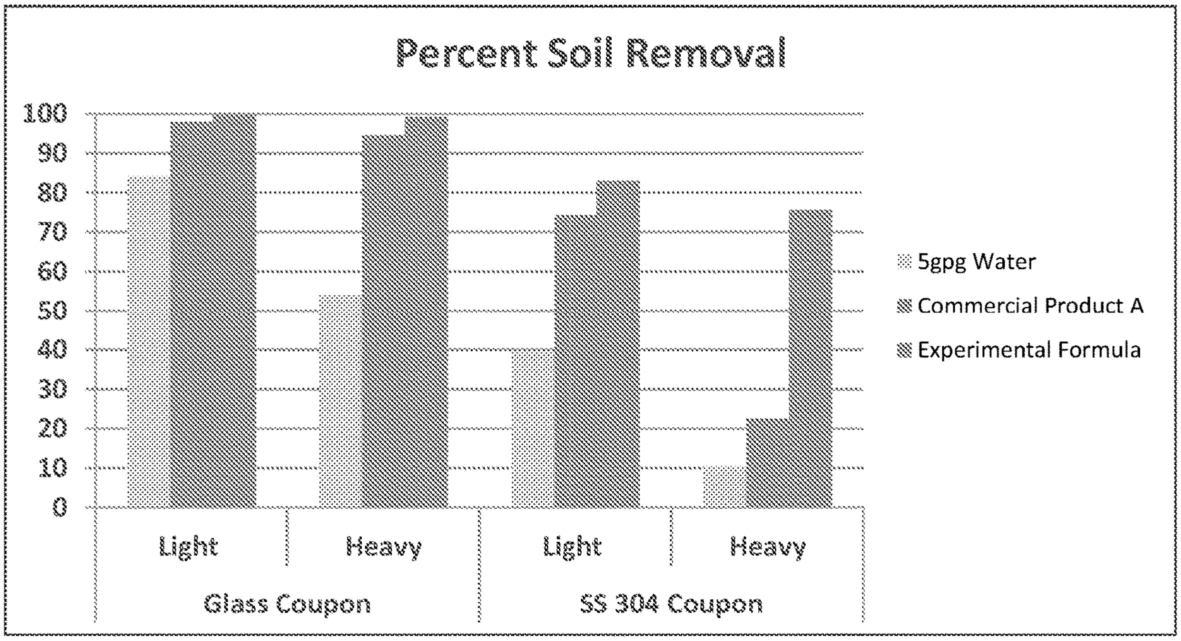
FIG. 6 is a graph of fatty soil removal with a non-caustic based formulas with the surfactant system replaced with the surfactant system of the invention.

The results show that an extended surfactant is critical for microemulsion formation with triglyceride oil. The results are shown in FIG. 6.

v) Terg-o-Meter Test

Extended Surfactants Compared with Current In-Line Formulas Containing NPEs and AEs:

A tergitometer test was performed to determine the efficacy of extended surfactant formula against Commercial Detergent formulas, listed below. The following conditions were used in the testing; DI water, 140° F., 10 minute wash, 1500 ppm active surfactant was added to the soiled swatches directly and allowed to soak for 5 minutes, 100 rpm, 3 soybean oil swatches. Each formula was tested with 0 ppm caustic, and 800 ppm caustic (from 50% NaOH).

The swatches were prepared as follows:

a. 300 g Soybean oil.
b. Using analytical balance, all swatches were premassed.
c. The swatches were saturated with the oil, placed between blotter sheets, and run through the padder with 45 pounds of weight.
d. The swatches were placed on racks and allowed to cure for testing.
e. Using analytical balance, soiled swatches were masses.
f. After experiment was complete, swatches were allowed to air dry overnight.
g. Using analytical balance, cleaned swatches were masses and percent soil removal was calculated.

Figure 7:
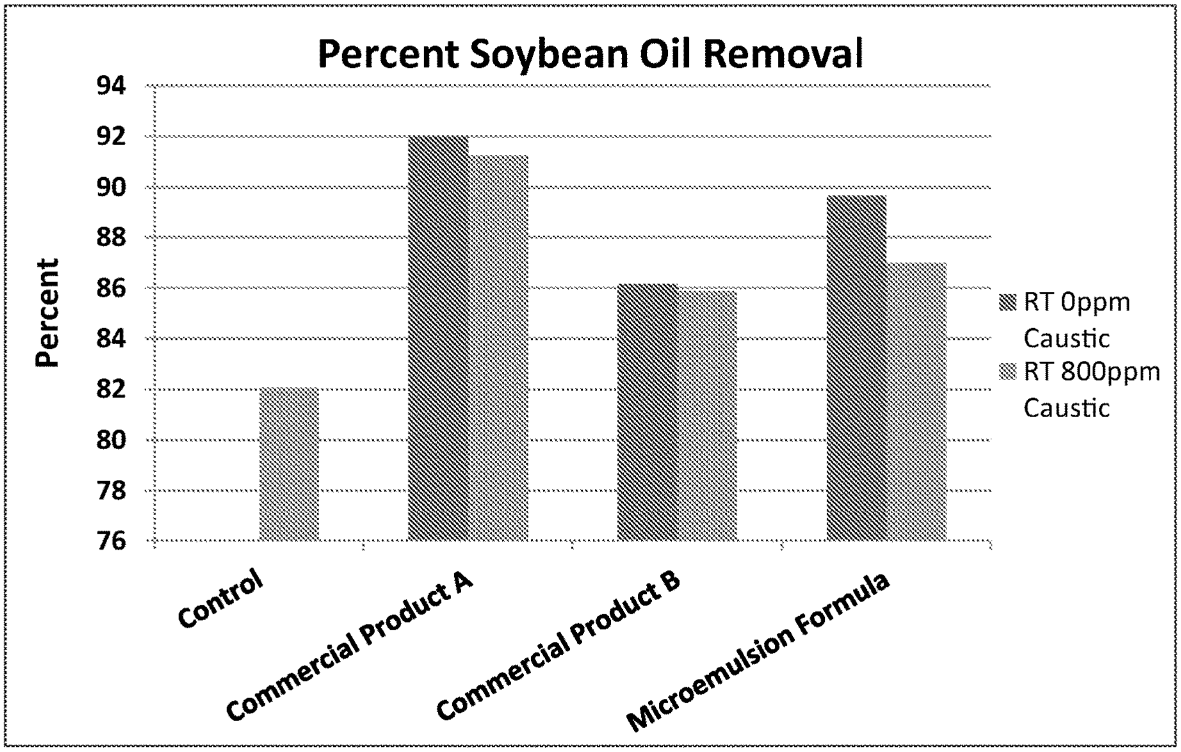
FIG. 7 is a graph showing the results of the terg-o-meter laundry test. Room temperature detergency test for soybean oil removal from cotton.

FIG. 7 is a graph showing the results of the terg-o-meter laundry test. Room temperature detergency test for soybean oil removal from cotton.

vi) Summary

A certain length of extension (moles of PO in the middle) is necessary. The required extension length is somewhere between 5 and 8 moles PO.

Just the extended surfactant alone is not enough. An appropriate co-surfactant is critical.

New novel co-surfactants discovered in this invention include:

1) Alkyl glycerol ether with 0 to 3 moles of ethoxylation; especially when the alkyl is branched such as ethyl hexyl to increase the effective cross-sectional area of the hydrophobe.
2) Short chain alcohol with low moles of ethoxylation (0-5).
3) Gemini surfactants with twin hydrophilic head and twin hydrophobic tails (H shape).

Because of the strong hydrogen bonding of the anionic charge group (worst for more water loving groups such as sulfate). It is very difficult, if not impossible, to form a liquid emulsion of equal portion active water/anionic surfactant/triglyceride.

Applicants have overcome such obstacle with the use of long enough PO extension on the anionic surfactant, greatly minimizing the formation of paste. The PO extension increases fluidity and greatly reduces interfacial viscoelasticity. The viscoelasticty reducing effect is enhanced with the further combination with novel co-surfactants.

The combined use of an anionic surfactant with enough PO extension as the main surfactant, and novel co-surfactants with the right structures as the minor component, can form liquid single phase microemulsions. The novel co-surfactants include alkyl glycerol ether, alkyl glycerol ether with low moles ethoxylation, short/medium chain alcohol low mole ethoxylates, and Gemini surfactants. These compositions are effective in forming microemulsions with oily soils, even the tough to 'microemulsify" non-tranfats such as fresh and used soybean oils, facilitating their eventual removal from a substrate. These compositions are also expected to provide ultra-low interfacial tensions with oils and be useful in the Energy applications such as Enhanced Oil Recovery.

The combined use of both extended anionic and extended non-ionic surfactants, preferably with a co-surfactant, is the most efficient in forming microemulsions with non-transfat oils.

What is claimed is:

1. A cleaning composition comprising:

a surfactant system comprising an extended chain anionic surfactant and a linker surfactant of a branched alkyl glycerol ether, an ethoxylated alkyl glycerol ether, a $C_2$ to $C_6$ alcohol ethoxylate, and/or a Gemini surfactant having two or more head groups and two or more tails; and an acid source.

2. The cleaning composition of claim 1 wherein said linker surfactant is ethyl hexyl glycerol ether.

3. The cleaning composition of claim 1 wherein said extended chain anionic surfactant and the linker surfactant are present in a ratio of greater than 1:1 percent by weight of extended chain anionic surfactant to linker surfactant.

4. The cleaning composition of claim 1 wherein said extended chain anionic surfactant and the linker surfactant are present in a ratio of 1:1.2 or greater percent by weight of extended chain anionic surfactant to linker surfactant.

5. The cleaning composition of claim 1 wherein said ethoxylated alkyl glycerol ether has from about 1 to about 3 moles of ethoxylation.

6. The cleaning composition of claim 1 wherein said extended chain anionic surfactant comprises a compound of formula:

$$R\text{-}[L]_x\text{-}[O—CH_2—CH_2]_y\text{-}M$$

where R is a linear or branched, saturated or unsaturated, substituted or unsubstituted, aliphatic or aromatic hydrocarbon radical having from about 6 to 20 carbon atoms, L is a linking group, M is any ionic species, x is the chain length of the linking group ranging from 2-16, and y is the average degree of ethoxylation ranging from 1 to 5.

7. The cleaning composition of claim 6 wherein said linking group has 5 or more moles of propoxylation.

8. The cleaning composition of claim 7 wherein said extended chain anionic surfactant is $C_{12}$-$(PO)_{16}$-$(EO)_2$ sulfate.

9. The cleaning composition of claim 1, further comprising one or more of a co-surfactant, solvent, or water conditioning agent.

10. The cleaning composition of claim 1, wherein said composition is a hard surface cleaning composition.

11. The cleaning composition of claim 1, wherein the surfactant system is included in an amount of from about 40 wt. % to about 80 wt. % and the acid source is included in an amount of from about 0.1 wt. % to about 0.55 wt. %.

12. A laundry detergent composition comprising:

a surfactant system comprising an extended chain anionic surfactant and a linker surfactant of a branched alkyl glycerol ether, an ethoxylated alkyl glycerol ether, a $C_2$ to $C_6$ alcohol ethoxylate, and/or a Gemini surfactant having two or more head groups and two or more tails; and a builder.

13. The laundry detergent composition of claim 12 wherein said linker surfactant is ethyl hexyl glycerol ether.

14. The laundry detergent composition of claim 12 wherein said extended chain anionic surfactant and the linker surfactant are present in a ratio of greater than 1:1 percent by weight of extended chain anionic surfactant to linker surfactant.

15. The laundry detergent composition of claim 12 wherein said extended chain anionic surfactant and the linker surfactant are present in a ratio of 1:1.2 or greater percent by weight of extended chain anionic surfactant to linker surfactant.

16. The laundry detergent composition of claim 12 wherein said ethoxylated alkyl glycerol ether has from about 1 to about 3 moles of ethoxylation.

17. The laundry detergent composition of claim 12 wherein said extended chain anionic surfactant comprises a compound of formula:

$$R\text{-}[L]_x\text{-}[O—CH_2—CH_2]_y\text{-}M$$

where R is a linear or branched, saturated or unsaturated, substituted or unsubstituted, aliphatic or aromatic hydrocarbon radical having from about 6 to 20 carbon atoms, L is a linking group, M is any ionic species, x is the chain length of the linking group ranging from 2-16, and y is the average degree of ethoxylation ranging from 1 to 5.

18. The laundry detergent composition of claim 17 wherein said linking group has 5 or more moles of propoxylation.

19. The laundry detergent composition of claim 18 wherein said extended chain anionic surfactant is $C_{12}$-$(PO)_{16}$-$(EO)_2$ sulfate.

20. The laundry detergent composition of claim 12, further comprising an enzyme.

* * * * *